United States Patent
Feng (10) Patent No.: US 11,290,873 B2
(45) Date of Patent: Mar. 29, 2022

(54) SERVICE NOTIFICATION METHOD FOR MOBILE EDGE HOST AND APPARATUS

(71) Applicant: HUAWEI TECHNOLOGIES CO., LTD., Guangdong (CN)

(72) Inventor: Jiangping Feng, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 10 days.

(21) Appl. No.: 16/879,361

(22) Filed: May 20, 2020

(65) Prior Publication Data

US 2020/0288302 A1    Sep. 10, 2020

Related U.S. Application Data (63) Continuation of application No. PCT/CN2017/112378, filed on Nov. 22, 2017.

(51) Int. Cl.
| | | |
|---|---|---|
| *H04W 8/30* | (2009.01) | |
| *H04W 36/30* | (2009.01) | |
| *H04W 8/20* | (2009.01) | |
| *H04W 40/04* | (2009.01) | |
| *H04W 68/00* | (2009.01) | |

(52) U.S. Cl.
CPC ............ *H04W 8/30* (2013.01); *H04W 8/20* (2013.01); *H04W 36/305* (2018.08); *H04W 40/04* (2013.01); *H04W 68/005* (2013.01)

(58) Field of Classification Search
CPC ........ H04W 40/04; H04W 8/30; H04W 8/20; H04W 68/005; H04W 28/08; H04W 36/305; H04W 68/00; H04W 36/30; H01L 29/08

USPC ........................................................ 370/329
See application file for complete search history.

(56) References Cited

U.S. PATENT DOCUMENTS

| | | | | |
|---|---|---|---|---|
| 10,299,239 | B2 * | 5/2019 | Xiong ................... | H04W 60/04 |
| 10,419,983 | B2 * | 9/2019 | Zhu ....................... | H04W 76/12 |
| 10,440,096 | B2 * | 10/2019 | Sabella ................. | H04L 47/803 |
| 10,440,559 | B2 * | 10/2019 | Ye .......................... | H04L 45/58 |
| 10,470,150 | B2 * | 11/2019 | Xiong ................... | H04L 29/00 |
| 10,567,291 | B2 * | 2/2020 | Sabella ................. | H04M 15/93 |
| 10,693,950 | B2 * | 6/2020 | Chen ..................... | H04L 67/10 |

(Continued)

FOREIGN PATENT DOCUMENTS

| | | |
|---|---|---|
| CN | 106231607 A | 12/2016 |
| CN | 106254408 A | 12/2016 |

(Continued)

OTHER PUBLICATIONS

Office Action issued in Chinese Application No. 201780096776.X dated Nov. 27, 2020, 6 pages.

(Continued)

*Primary Examiner* — Man U Phan
(74) *Attorney, Agent, or Firm* — Fish & Richardson P.C.

(57) ABSTRACT

Embodiments of the application disclose service notification methods and mobile edge hosts. In an embodiment, a method comprising: receiving, by a first mobile edge platform, a service registration message from a first application instance, wherein the first mobile edge platform and the first application instance are comprised in a first mobile edge host; and sending, by the first mobile edge platform, a service notification message to a second mobile edge platform comprised in a second mobile edge host.

20 Claims, 7 Drawing Sheets

(56) References Cited

U.S. PATENT DOCUMENTS

| | | | |
|---|---|---|---|
| 10,771,569 B1* | 9/2020 | Wang | H04W 24/02 |
| 10,827,329 B1* | 11/2020 | Dowlatkhah | H04L 47/765 |
| 10,873,886 B2* | 12/2020 | Shi | H04W 36/06 |
| 10,887,801 B2* | 1/2021 | Hong | H04W 36/0022 |
| 10,938,736 B2* | 3/2021 | Guo | H04L 67/1008 |
| 10,972,575 B2* | 4/2021 | Li | H04L 67/327 |
| 2016/0366244 A1* | 12/2016 | Chiu | H04L 67/32 |
| 2017/0118311 A1* | 4/2017 | Frydman | H04L 67/42 |
| 2017/0251368 A1* | 8/2017 | Ross | H04W 12/03 |
| 2019/0124496 A1* | 4/2019 | Ye | H04L 12/66 |
| 2020/0351637 A1* | 11/2020 | Wang | H04W 8/18 |
| 2021/0211914 A1* | 7/2021 | de la Oliva | H04W 24/10 |

FOREIGN PATENT DOCUMENTS

| | | |
|---|---|---|
| CN | 106358245 A | 1/2017 |
| WO | 2007022685 A1 | 3/2007 |
| WO | 2017091934 A1 | 6/2017 |
| WO | 2017091960 A1 | 6/2017 |

OTHER PUBLICATIONS

Draft ETSI GS MEC 002 V0.4.2 (Jul. 2015), "Mobile-Edge Computing (MEC); Technical Requirements," Jul. 2015, 41 pages.

ETSI GS MEC 003 V1.1 1 (Mar. 2016),Mobile Edge Computing (MEC);Framework and Reference Architecture,total 18 pages.

ETSI GS MEC 011 V1.1.1 (Jul. 2017), "Mobile Edge Computing(MEC); Mobile Edge Platform Application Enablement," Jul. 2017, 55 pages.

ETSI GS MEC 001 V1.1.1 (Mar. 2016), "Mobile Edge Computing (MEC) Terminology," Mar. 2016, 7 pages.

Extended European Search Report issued in European Application No. 17932687.1 dated Jul. 21, 2020, 8 pages.

PCT International Search Report and Written Opinion issued in International Application No. PCT/CN2017/112378 dated Jul. 27, 2018, 15 pages (with English translation).

* cited by examiner

FIG. 1

PRIOR ART

SERVICE NOTIFICATION METHOD FOR MOBILE EDGE HOST AND APPARATUS

CROSS-REFERENCE TO RELATED APPLICATIONS

This application is a continuation of International Application No. PCT/CN2017/112378, filed on Nov. 22, 2017, the disclosure of which is hereby incorporated by reference in its entirety.

TECHNICAL FIELD

The present invention relates to the communications field, and in particular, to a service notification method for a mobile edge host and an apparatus.

BACKGROUND

Mobile edge computing is to provide a cloud computing-based capability for a mobile user on a wireless network side near the user, so that the user can deploy an application at a network edge by using the capability. The mobile edge computing can also provide real-time wireless network information (such as a user location and base station load), and the user can develop differentiated applications by using the information. After the cloud computing capability is deployed at the network edge, a carrier-class service environment with high performance, a low latency, and high bandwidth can be created, to accelerate distribution and downloading of content, services, and applications in a network, so that a consumer enjoys network experience with higher quality.

An ultra-low latency service is extremely sensitive to a latency, but both a transmission path and a forwarding node increase the latency. The mobile edge computing enables content and a service to be deployed near a user, so that the transmission path is shorter and there are a smaller quantity of forwarding nodes. Therefore, the mobile edge computing is a necessary condition for implementing an ultra-low latency service. Typical scenarios include an internet of vehicles, industrial control, telemedicine, virtual reality/augmented reality, and the like.

Figure 1:
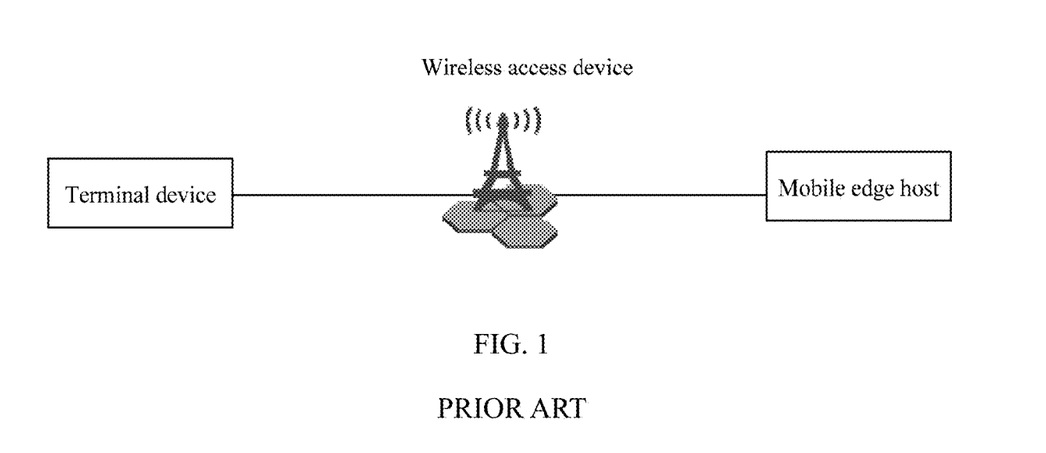
FIG. 1 is a schematic diagram of a mobile edge host deployed nearby in the prior art.

For an ultra-high bandwidth service, traffic of ultra-high bandwidth is processed nearby by deploying the mobile edge computing (such as a mobile edge host shown in FIG. 1) nearby, so that impact exerted by high bandwidth on a backbone network can be greatly reduced. Typical scenarios include live broadcast of a match in a stadium, live broadcast of a concert, mobile content distribution, and the like.

Figure 2:
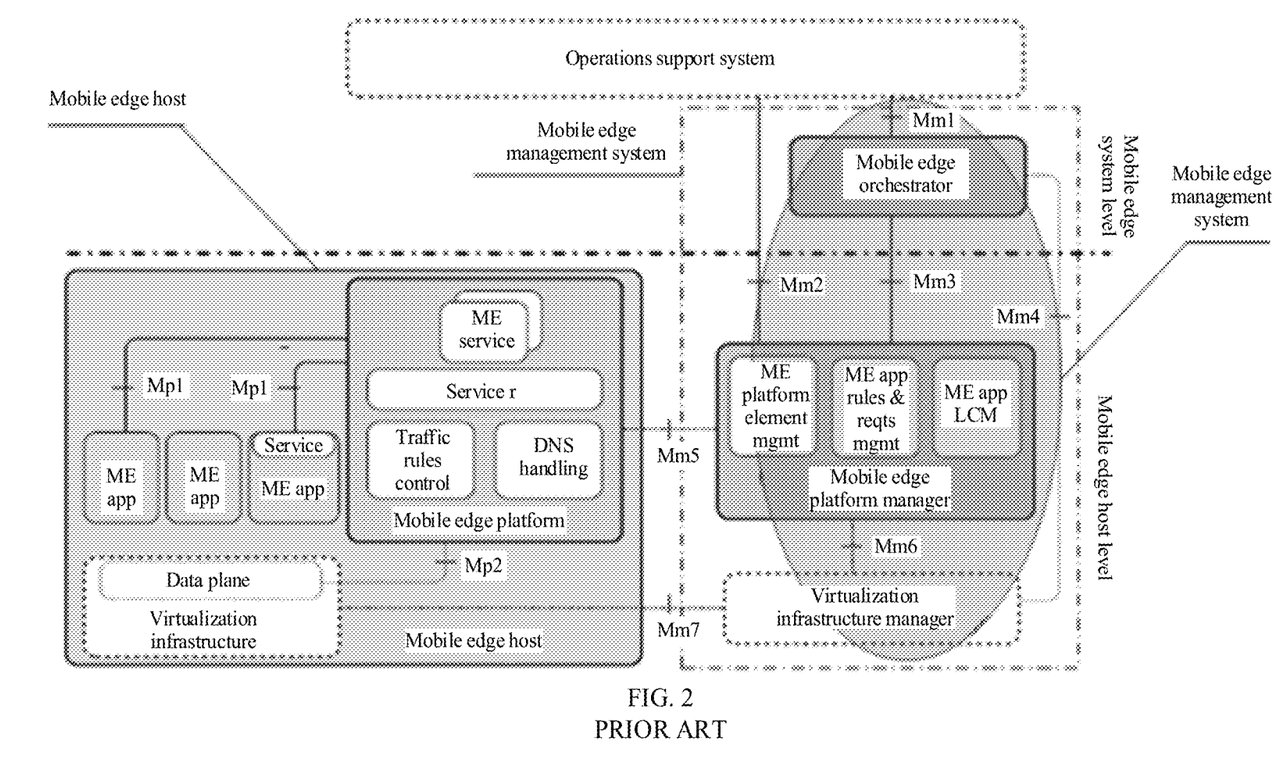
FIG. 2 is a diagram of a reference architecture of mobile edge computing in the prior art.

The European Telecommunications Standards Institute (ETSI) defines a reference architecture for mobile edge computing in the specification ETSI GS MEC 003. As shown in FIG. 2, the architecture mainly includes two parts: a mobile edge host and a mobile edge management system. The mobile edge host includes a mobile edge platform and a virtualized infrastructure. The virtual infrastructure provides virtualized computing, storage, and network resources for a mobile edge application, and the mobile edge application is deployed on the mobile edge host in a form of a virtual machine or a container. A mobile edge platform is further deployed on each mobile edge host, and the platform includes some common services such as a terminal location service, a wireless network information service, a DNS service, or a DNS proxy service. The mobile edge application can use these common services. The mobile edge management system includes a mobile edge orchestrator, a mobile edge platform manager, a virtualized infrastructure manager, and the like. The mobile edge orchestrator maintains an overall view of all mobile edge hosts, available resources, and available mobile edge services in the mobile edge system, and triggers application instantiation and termination. The mobile edge platform manager is configured to: manage the mobile edge platform, manage a life cycle of the mobile edge application, and manage a flow rule and a DNS rule of the application. The virtualized infrastructure manager manages a virtualized resource required by the mobile edge application.

The mobile edge application (referred to as an application hereinafter), such as an internet of vehicles application, an internet of things application, or a video cache application, may have a plurality of copies, which are referred to as application instances and are respectively deployed on different mobile edge hosts. A terminal device, such as an intelligent vehicle, an internet of things device, or a mobile phone, accesses these application instances nearby through an access network of a telecommunications operator. Some applications can provide some capabilities to be consumed by another application. A capability provider is referred to as a service, and the service may also have a plurality of instances. For example, the internet of vehicles application needs to know a specific location of a vehicle, and a location application can provide the specific location of the vehicle, and provide a capability of locating the specific location of the vehicle. In this case, the location application is a provider of a location service. The internet of vehicles application invokes the location service, and is a consumer of the location service. In addition, one or more location service instances may be deployed on each mobile edge host.

The mobile edge platform on the mobile edge host provides a service registration and discovery function. The mobile edge application and the service may register, with the mobile edge platform, services that can be provided by the mobile edge application and the service, query information about another service from the mobile edge platform, and subscribe to a status of another service from the mobile edge platform.

In a current mobile edge system architecture, an application or a service can only discover a service on a mobile edge host on which the application or the service is located. If the service on the current mobile edge host cannot provide a service due to some reasons (such as a software bug, and a fault of a VM on which the service is located), running of the application is affected, and even the service is interrupted.

SUMMARY

To resolve the foregoing technical problems, embodiments of the present invention provide a service notification method and an apparatus, so that even if a service on a mobile edge host cannot provide a service due to some reasons, normal running of an application instance on the mobile edge host is not affected.

A service notification method provided in an embodiment of the present invention is applied to a first mobile edge host and a second mobile edge host. The first mobile edge host includes a first mobile edge platform and a first application instance, and the second mobile edge host includes a second mobile edge platform.

The first mobile edge platform receives a service registration message from the first application instance.

The first mobile edge platform sends a service notification message to the second mobile edge platform.

The service registration message carries a service use indication identifier, and the indication identifier indicates whether the service can be used by an application instance on another mobile edge host.

The first mobile edge platform sends the service notification message to the second mobile edge platform based on the identifier.

In addition, before the first mobile edge platform receives the service registration message from the first application instance, the method includes: receiving, by the first mobile edge platform, a service availability subscription message sent by the second mobile edge platform to the first mobile edge platform; or preconfiguring, by the first mobile edge platform, the second mobile edge platform as an object for receiving the service notification message.

Further, the second mobile edge host further includes a second application instance, and the method includes:

sending, by the second application instance, a service availability subscription message to the second mobile edge platform; and after receiving the service notification message sent by the first mobile edge platform, sending, by the second mobile edge platform, a service notification message to the second application instance.

The service availability subscription message sent by the second application instance to the second mobile edge platform includes a location constraint identifier, and the identifier indicates that the second application instance subscribes to availability of a service running on the first mobile edge host and the second mobile edge host.

An embodiment of the present invention provides another service notification method, the method is applied to a first mobile edge host, and the first mobile edge host includes a first mobile edge platform, a first application instance, and another application instance.

The first mobile edge platform receives a service registration message from the first application instance, where the service registration message carries a service use indication identifier, and the indication identifier indicates whether the service can be used by an application instance on another mobile edge host.

The first mobile edge platform sends a service notification message to another application instance that is located on the first mobile edge host and that subscribes to service availability.

The method is further applied to a second mobile edge host, the second mobile edge host includes a second mobile edge platform, and the method includes:

sending, by the second mobile edge platform, a service availability subscription message to the first mobile edge platform; and determining, by the first mobile edge platform based on the indication identifier, whether to send a service notification message to the second mobile edge platform on the second mobile edge host.

An embodiment of the present invention provides a mobile edge host, including a mobile edge platform, a first application instance, and another application instance.

The first application instance is configured to send a service registration message to the mobile edge platform, where the service registration message carries a service use indication identifier, and the indication identifier indicates whether the service can be used by an application instance on another mobile edge host.

The mobile edge platform is configured to send a service notification message to another application instance that is located on the mobile edge host and that subscribes to service availability.

An embodiment of the present invention provides a mobile edge communications system, including a first mobile edge host and a second mobile edge host. The first mobile edge host includes a first mobile edge platform and a first application instance, and the second mobile edge host includes a second mobile edge platform.

The first mobile edge platform is configured to receive a service registration message from the first application instance.

The first mobile edge platform is configured to send a service notification message to the second mobile edge platform.

The service registration message carries a service use indication identifier, and the indication identifier indicates whether the service can be used by an application instance on another mobile edge host.

The first mobile edge platform is configured to send the service notification message to the second mobile edge platform based on the identifier.

An embodiment of the present invention provides a computer readable storage medium. The computer readable storage medium stores an executable program instruction, and when the executable program instruction is run, the steps of the foregoing methods are performed.

An embodiment of the present invention further provides a computer program product, and when being executed, the computer product is used to perform the steps of the foregoing methods.

According to the method and the apparatus provided in the foregoing embodiments, an application instance on a mobile edge host can not only discover and use a service on the mobile edge host on which the application instance is located, but also can discover and use a service on another mobile edge host. Even if the service on the current mobile edge host is faulty, the service on the another mobile edge host can be used, thereby ensuring normal running of an application on the current mobile edge host. In addition, a service instance may not necessarily be deployed on each edge host, so that different mobile edge hosts share resources, thereby saving resources.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may obtain other accompanying drawings from these accompanying drawings without creative efforts.

DESCRIPTION OF EMBODIMENTS

To make the purpose, technical solutions, and advantages of the embodiments of the present invention more clearly, the following describes the technical solutions of the embodiments of the present invention with reference to the accompanying drawings in the embodiments of the present invention.

An embodiment of the present invention provides a host cluster including neighboring mobile edge hosts. The hosts in the cluster exchange related information about various services that can be provided by the hosts. The host cluster mainly has the following two interconnection manners:

1. A Full Mesh Manner

Figure 3:
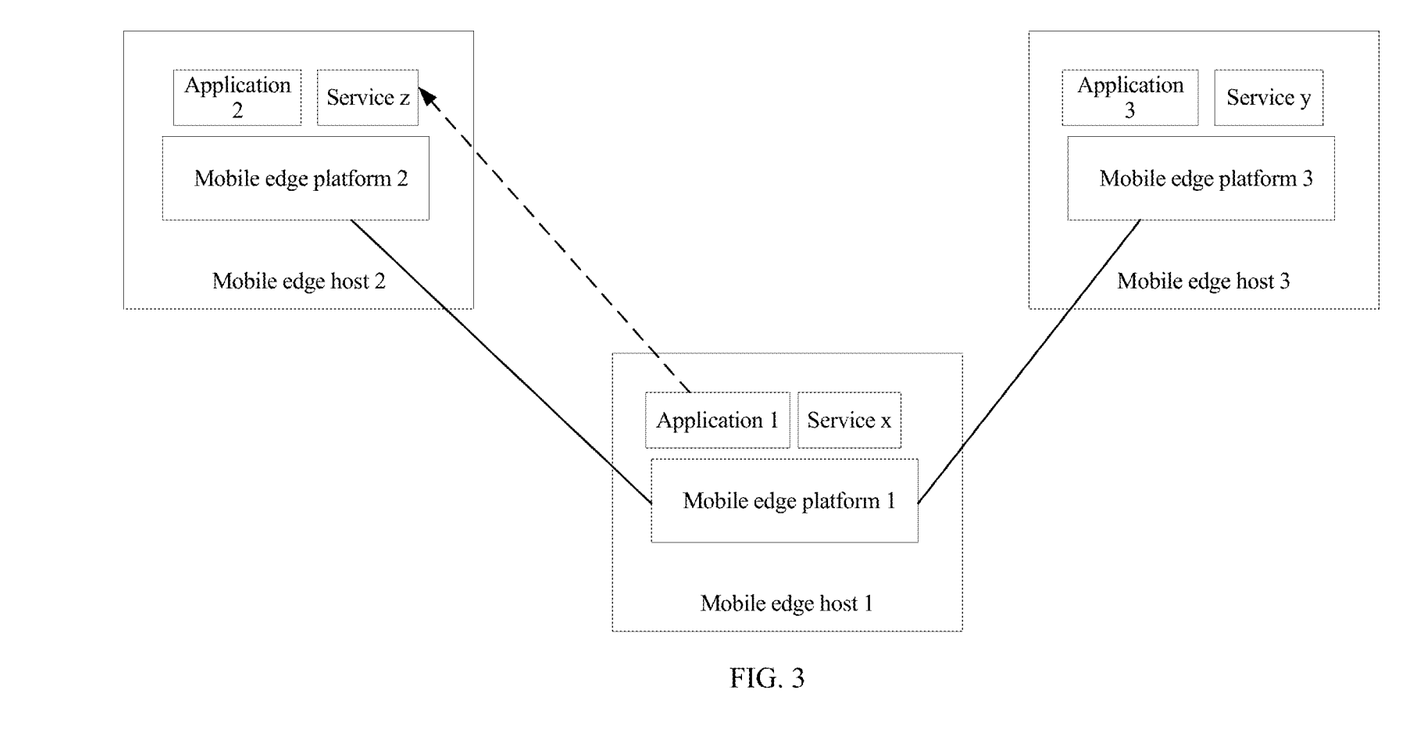
FIG. 3 is a schematic diagram of a full mesh manner of a host cluster according to an embodiment of the present invention.

As shown in FIG. 3, all or some of mobile edge platforms store address information of another mobile edge platform in the cluster, and can be connected to the another mobile edge platform. After being started, a mobile edge platform first queries, from another mobile edge platform in the cluster, information about a service registered with the platform, and then subscribes to a service availability change notification from the another mobile edge platform in the cluster. Service availability changes include a service registration change and a service status change, and the service status change includes a change from "available" to "unavailable" or from "unavailable" to "available".

2. A Hierarchy Registration Manner

Figure 4:
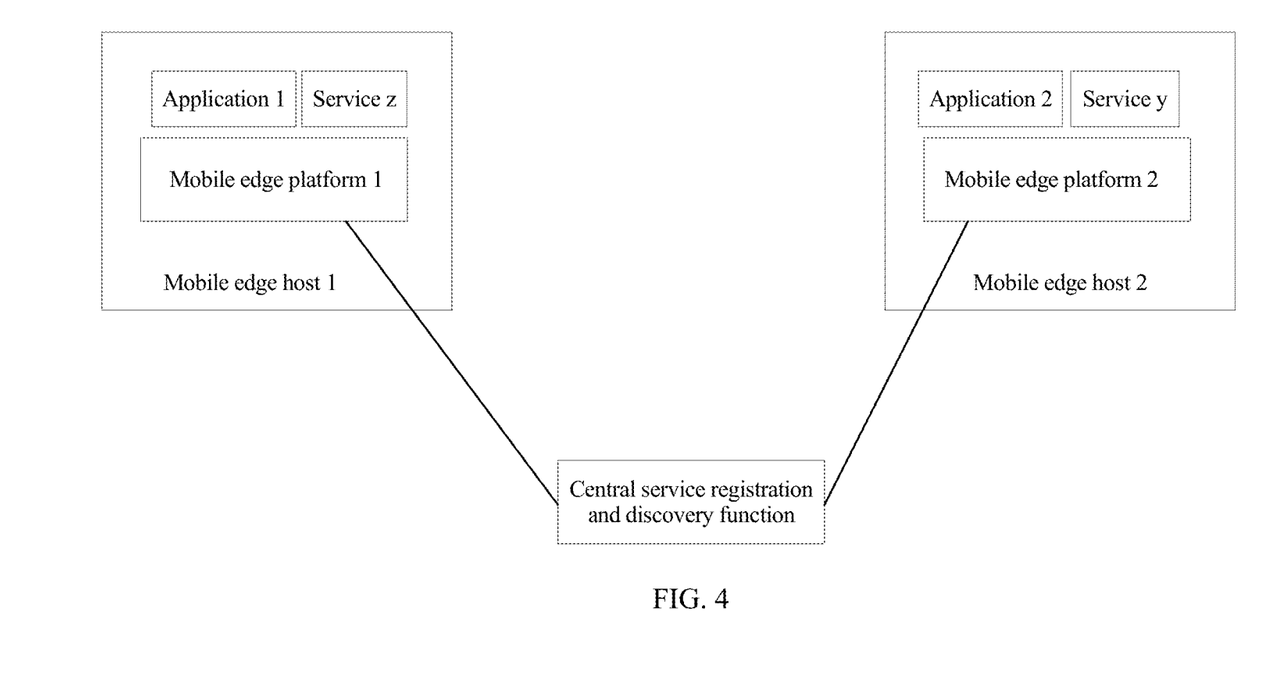
FIG. 4 is a schematic diagram of a hierarchy registration manner of a host cluster according to an embodiment of the present invention.

As shown in FIG. 4, a central service registration and discovery function is deployed in each cluster. A service registers a status of the service with a mobile edge platform on a current mobile edge host, and issues the status of the service to the mobile edge platform. A local mobile edge platform registers a status of a local service with the central service registration and discovery function, issues the status of the local service to the central service registration and discovery function, and subscribes to a service registered with another mobile edge platform. The central service registration and discovery function stores information about all services that are in the cluster and that can be used by an application on another mobile edge host, and can respond to a query request and a subscription request of the mobile edge platform. In an extreme case, all mobile edge hosts are in one cluster. In this case, there is only one central service registration function in a system.

In the foregoing manners, a mobile edge platform on a mobile edge host may store related information about different services located on different mobile edge hosts. For example, the related information may include information such as information indicating whether a service instance is deployed on a same mobile edge host as a current mobile edge platform, and information such as an address, a version, an instance status, and a type of the service instance. For specific information, refer to the following table:

Related information about various services stored on a mobile edge platform:

| Service instance | Local or not | Service instance address | Service instance version | Service instance status | Service instance type |
|---|---|---|---|---|---|
| Service instance 1 | Yes | Address 1 | Version 1 | Activated | Location type |
| Service instance 2 | No | Address 2 | Version 2 | Deactivated | Bandwidth management type |

Embodiment 1 provides a service notification method in a single mobile edge host, that is, a procedure about how an application instance in a single mobile edge host discovers a service on a platform. Details are as follows.

Embodiment 1

Figure 5:
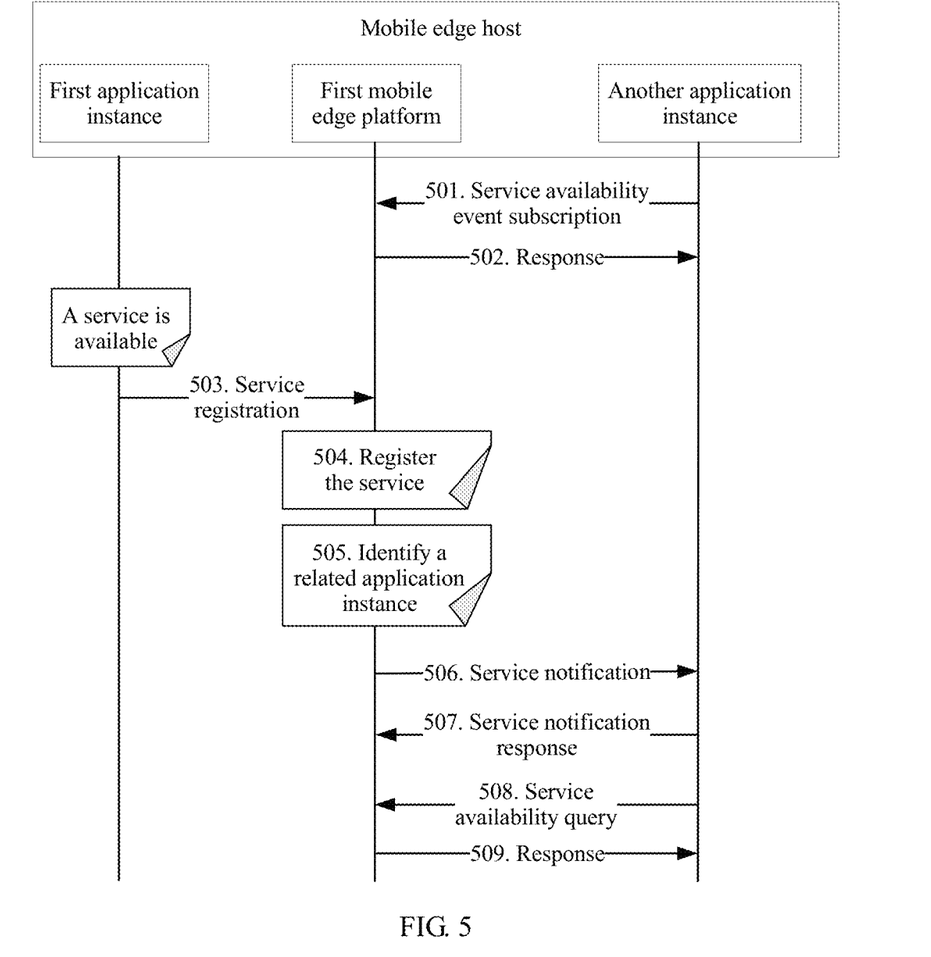
FIG. 5 is a flowchart of a service notification method in a single mobile edge host according to an embodiment of the present invention.

Referring to FIG. 5, a first mobile edge host in the figure includes a first mobile edge platform, a first application instance, and another application instance.

501. The another application instance sends a service availability event subscription request to the first mobile edge platform. The subscription request carries a filter condition for a subscription event. The filter condition may be a service instance identifier, a service name, a service type, a service status, a service location constraint identifier, or a combination of these attributes. The location constraint identifier indicates whether an application instance subscribes to availability of only a service instance running on a local host, or subscribes to availability of all service instances (including a service instance running on another mobile edge host). The local host is a mobile edge host on which an application instance sending a subscription request is located. In this embodiment, the local host is the first mobile edge host.

502. The first mobile edge platform sends a response message, to indicate that the subscription request is accepted.

503. After a service instance provided by the first application instance is deployed and is available for the first time, the first application instance sends a service registration message to the first mobile edge platform, to register the service instance, and provide a service. The registration message carries a service name, a service type, a service version, and transmission information used by the service. In addition, the registration message carries a service use indication identifier, and the indication identifier indicates whether the service instance can only be used by an application on the mobile edge host.

504. The first mobile edge platform registers the service instance with a service registration and discovery function, and stores the indication identifier indicating whether the service instance can only be used by the application on the mobile edge host. The identifier indicating whether the service instance can only be used by the application on the mobile edge host may be alternatively described in a descriptor of an application providing the service, is delivered by a mobile edge platform manager to the first mobile edge platform in an application instantiation process, and is stored by the first mobile edge platform.

505. The first mobile edge platform identifies an application instance that subscribes to a service status, where the application instance is the another application instance in this embodiment.

506. The first mobile edge platform sends a service availability notification to the another application instance, where the notification includes information about the service instance, and the information about the service instance includes one or more of the following information: the service name, the service version, the service type, the service status, the transmission information used by the service, the identifier indicating whether the service instance can only be used by the application on the mobile edge host, and an identifier indicating whether the service instance runs on a same mobile edge host as the application instance that subscribes to the service status.

507. The another application instance sends a response message to the first mobile edge platform.

508. Optionally, the another application instance may subsequently send a service availability query request to the first mobile edge platform. The query request includes a service location constraint identifier. The location constraint identifier indicates whether the another application instance queries only a service instance running on the local host.

509. The first mobile edge platform sends a response message to the another application instance. If the location constraint identifier in the previous step indicates that the another application instance queries only the service instance running on the local host, the response message includes information about only a service instance running on the first mobile edge host. If the location constraint identifier in the previous step indicates that the another application instance queries all service instances, the response message includes both information about a service instance running on the first mobile edge host and information about a service instance running on another mobile edge host (such as a second mobile edge host). The information about the service instance includes one or more of the following information: the service name, the service version, the service type, the service status, the transmission information used by the service, the identifier indicating whether the service instance can only be used by the application on the mobile edge host, and the identifier indicating whether the service instance runs on a same mobile edge host as the application instance that subscribes to the service status.

If availability of the service of the first application instance is updated subsequently, the first application instance sends a service update message to the first mobile edge platform.

Similar to the foregoing registration procedure, the first mobile edge platform receives the service update message, and sends a service update notification message to another application instance that is located on the first mobile edge platform host and that subscribes to the service availability.

After receiving the service availability notification or a service query response message, the another application instance selects one service instance from a list of available service instances to initiate invoking. When discovering that a service instance is "unavailable", the application instance deletes the service instance from the list of available service instances. When a service instance changes from an "unavailable" state to an "available" state, the application instance adds the service instance to the list of available service instances.

Further, Embodiment 2 provides a service notification method between different mobile edge hosts, that is, a procedure about how an application instance in a mobile edge host discovers a service in another mobile edge host. Details are as follows:

Embodiment 2

Figure 6:
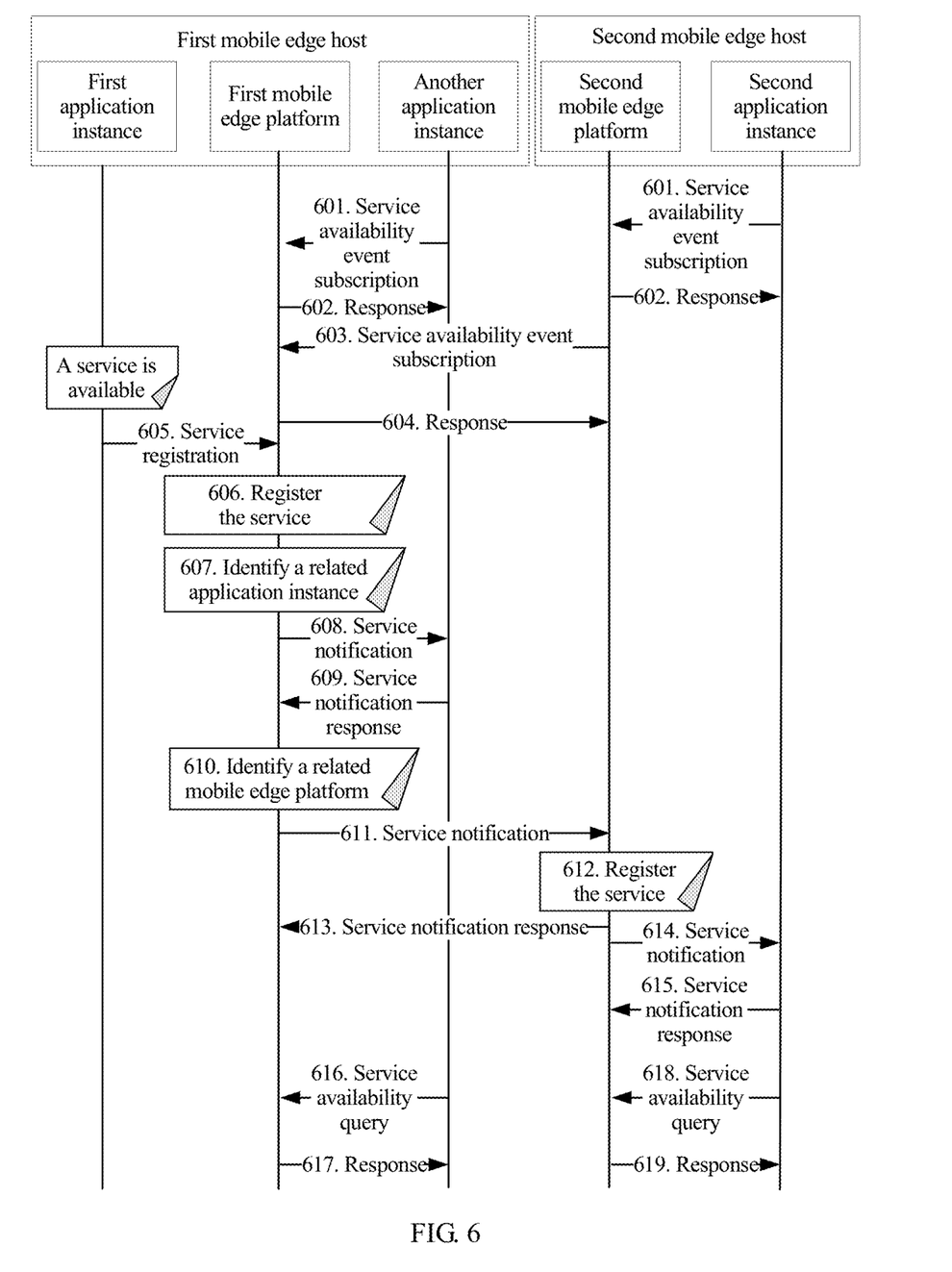
FIG. 6 is a flowchart of a service notification method between different mobile edge hosts according to an embodiment of the present invention.

Referring to FIG. 6, the figure includes a first mobile edge host and a second mobile edge host, the first mobile edge host includes a first mobile edge platform and a first application instance, and the second mobile edge host includes a second mobile edge platform and a second application instance.

601. Another application instance sends a service availability event subscription request to the first mobile edge platform, and the second application instance sends a service availability event subscription request to the second mobile edge platform. The subscription request carries a filter condition for a subscription event. The filter condition may be a service instance identifier, a service name, a service type, a service status, a service location constraint identifier, or a combination of these attributes. The location constraint identifier indicates whether an application instance subscribes to availability of only a service instance running on a local host, or subscribes to availability of all service instances (including a service instance running on another mobile edge host).

602. The first mobile edge platform and the second mobile edge platform each send a response message, to indicate that the subscription request is accepted.

603. Optionally, the second mobile edge platform sends a service availability event subscription request to the first mobile edge platform. The subscription request carries a filter condition for a subscription event. The filter condition may be a service instance identifier, a service name, a service type, a service status, a service location constraint identifier, or a combination of these attributes. The location constraint identifier indicates that availability of only a service instance running on the first mobile edge host is subscribed to.

604. Optionally, the first mobile edge platform sends a response message to the second mobile edge platform, to indicate that the subscription request is accepted.

If there is no service availability event subscription request and response process between the second mobile edge platform and the first mobile edge platform in step 603 and step 604, another manner such as the following configuration manner may be used: A specific mobile edge platform to which a notification message needs to be sent when a service is registered or when service availability changes may be configured on the first mobile edge platform.

605. After a service instance provided by the first application instance is deployed and is available for the first time, the first application instance sends a service registration message to the first mobile edge platform, to register the service instance, and provide a service. The registration message carries a service name, a service type, a service version, and transmission information used by the service. In addition, the registration message carries a service use indication identifier, and the indication identifier indicates whether the service instance can only be used by an application on the mobile edge host. In this embodiment, the indication identifier indicates that the service can be used by an application instance on another mobile edge host.

606. The first mobile edge platform registers the service instance with a service registration and discovery function, and stores the indication identifier indicating whether the service instance can only be used by the application on the mobile edge host. The identifier indicating whether the service instance can only be used by the application on the mobile edge host may be alternatively described in a descriptor of an application providing the service, is delivered by a mobile edge platform manager to the first mobile edge platform in an application instantiation process, and is stored by the first mobile edge platform.

607. The first mobile edge platform identifies an application instance that subscribes to a service status, where the application instance is the another application instance in this embodiment.

608. The first mobile edge platform sends a service availability notification to the another application instance, to indicate that a new service instance is available.

609. The another application instance sends a response message to the first mobile edge platform.

610. The first mobile edge platform determines, based on the indication identifier in the foregoing step, whether the service instance can be used by the application instance on the another mobile edge host. If the service instance can be used by the application instance on the another mobile edge host, the first mobile edge platform identifies a related mobile edge platform that subscribes to the service status, and the mobile edge platform identified in this embodiment is the second mobile edge platform.

611. The first mobile edge platform sends a service availability notification to the second mobile edge platform, to indicate that the service instance is available. The notification may carry an identifier, to indicate that a location of the service instance is "non-local", in other words, the service instance is not from the second mobile edge host.

612. The second mobile edge platform registers the service instance, identifies the location of the service instance as "non-local", and sends a service notification to a local application instance that is capable of using a non-local service and that subscribes to the service status.

613. The second mobile edge platform sends a response message to the first mobile edge platform.

614. The second mobile edge platform sends a service availability notification to the second application instance, to indicate that the new service instance is available. In this embodiment, the second application instance is the application instance that is located on the second mobile edge host and that meets a condition of subscribing to the service status and being capable of using the non-local service in step 612.

615. The second application instance sends a response message to the second mobile edge platform.

616. Optionally, the another application instance located on the first mobile edge host may subsequently send a service availability query request to the first mobile edge platform. The query request includes a service location constraint identifier. The location constraint identifier indicates whether the another application instance queries only the service instance running on the local host.

617. The first mobile edge platform sends a response message to the another application instance, where the response message includes information about the new service instance. If the location constraint identifier in the previous step indicates that the another application instance queries only the service instance running on the local host, the response message includes information about only a service instance running on the first mobile edge host. If the location constraint identifier in the previous step indicates that the another application instance queries all service instances, the response message includes both information about a service instance running on the first mobile edge host and information about a service instance running on another mobile edge host (such as the second mobile edge host). The information about the service instance includes one or more of the following information: the service name, the service version, the service type, the service status, the transmission information used by the service, the identifier indicating whether the service instance can only be used by the application on the mobile edge host, and an identifier indicating whether the service instance runs on a same mobile edge host as the application instance that subscribes to the service status.

618. Optionally, the second application instance may subsequently send a service availability query request to the second mobile edge platform. The query request includes a service location constraint identifier. The location constraint identifier indicates whether the second application instance queries only the service instance running on the local host.

619. The second mobile edge platform sends a response message to the second application instance. If the location constraint identifier in step 618 indicates that the second application instance queries only the service instance running on the local host, the response message does not include information about any service instance. If the location constraint identifier in step 618 indicates that the second application instance queries service instances located on all mobile edge hosts, the response message includes the information about the service instance in the foregoing step. The information about the service instance includes one or more of the following information: the service name, the service version, the service type, the service status, the transmission information used by the service, the identifier indicating whether the service instance can only be used by the application on the mobile edge host, and the identifier indicating whether the service instance runs on a same mobile edge host as the application instance that subscribes to a service status.

If availability of the service of the first application instance is updated subsequently, the first application instance sends a service update message to the first mobile edge platform. Similar to the foregoing registration procedure, the first mobile edge platform receives the service update message, sends a service update notification message to the second mobile edge platform on the second mobile edge host, and sends a service update notification message to another application instance that is located on the first mobile edge host and that subscribes to service availability.

After receiving the service availability notification or a service query response message, the another application instance and the second application instance select a service instance from a list of available service instances to initiate invoking. When discovering that a service instance is "unavailable", the application instance deletes the service instance from the list of available service instances. When a service instance changes from an "unavailable" state to an "available" state, the application instance adds the service instance to the list of available service instances.

In addition, the steps described in Embodiment 2 are applicable to both the full mesh manner and the hierarchy registration manner. If the hierarchy registration manner is used, messages sent by the first mobile edge platform and the second mobile edge platform to each other are forwarded by using a central service registration and discovery function. In this manner, interconnection between every two of different mobile edge hosts in the full mesh manner can be avoided, so that connection complexity can be reduced.

According to the methods provided in the foregoing embodiments, an application instance on a mobile edge host can not only discover and use a service on the mobile edge host on which the application instance is located, but also can discover and use a service on another mobile edge host. For example, the second application instance on the second mobile edge host in the foregoing embodiment can discover the service provided by the first application instance located on the first mobile edge host. Therefore, even if the service on the current mobile edge host is faulty, the service on the another mobile edge host can be used, thereby ensuring normal running of an application on the current mobile edge host. In addition, a service instance may not necessarily be deployed on each edge host, so that different mobile edge hosts share resources, thereby saving resources.

Figure 7:
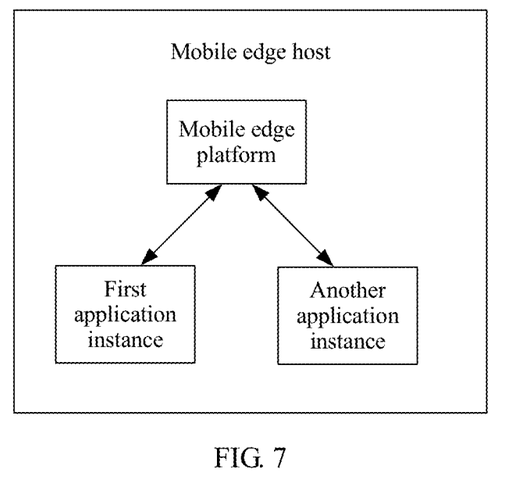
FIG. 7 is a schematic structural diagram of a mobile edge host according to an embodiment of the present invention.

FIG. 7 shows a mobile edge host according to an embodiment of the present invention. The mobile edge host may be configured to perform steps performed by the mobile edge host in the foregoing methods. The mobile edge host may include a first mobile edge platform, a first application instance, and another application instance.

Mainly, the first application instance is configured to send a service registration message to the first mobile edge platform, where the service registration message carries a service use indication identifier, and the indication identifier indicates whether the service can be used by an application instance on another mobile edge host.

The first mobile edge platform is configured to send a service notification message to another application instance that is located on the mobile edge host and that subscribes to service availability.

The first mobile edge platform determines, based on the indication identifier, whether to send a service notification message to a mobile edge platform on the another mobile edge host. When the indication identifier indicates that the service cannot be used by the application instance on the another mobile edge host, the first mobile edge platform determines, based on the indication identifier, not to send the service notification message to the mobile edge platform on the another mobile edge host. When the indication identifier indicates that the service can be used by the application instance on the another mobile edge host, the first mobile edge platform determines, based on the indication identifier, to send the service notification message to the mobile edge platform on the another mobile edge host. However, a precondition for sending is that the another mobile edge host has previously sent a service availability subscription message to the first mobile edge platform or that a notification message needs to be sent to the mobile edge platform on the another mobile edge host when the service is registered or a status change is configured on the first mobile edge platform.

Figure 8:
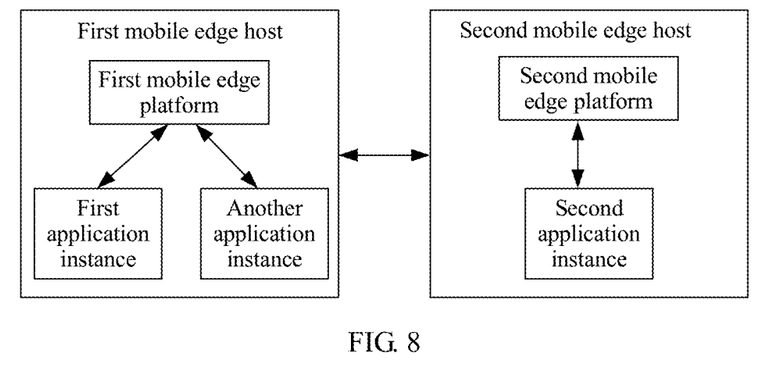
FIG. 8 is a schematic diagram of a mobile edge communications system according to an embodiment of the present invention.

Referring to FIG. 8, an embodiment of the present invention further provides a mobile edge communications system, including a first mobile edge host and a second mobile edge host. The system is configured to perform steps performed by the first mobile edge host and the second mobile edge host in Embodiment 2. Mainly:

The first mobile edge host includes a first mobile edge platform and a first application instance, and the second mobile edge host includes a second mobile edge platform.

The first mobile edge platform is configured to receive a service registration message from the first application instance.

The first mobile edge platform sends a service notification message to the second mobile edge platform.

Specifically, the service registration message carries a service use indication identifier, and the indication identifier indicates that a service can be used by an application instance on another mobile edge host. The first mobile edge platform is configured to send the service notification message to the second mobile edge platform based on the identifier.

Further, before the first mobile edge platform receives the service registration message from the first application instance, the first mobile edge platform is configured to receive a service availability subscription message sent by the second mobile edge platform to the first mobile edge platform, or the first mobile edge platform preconfigures the second mobile edge platform as an object for receiving the service notification message.

Figure 9:
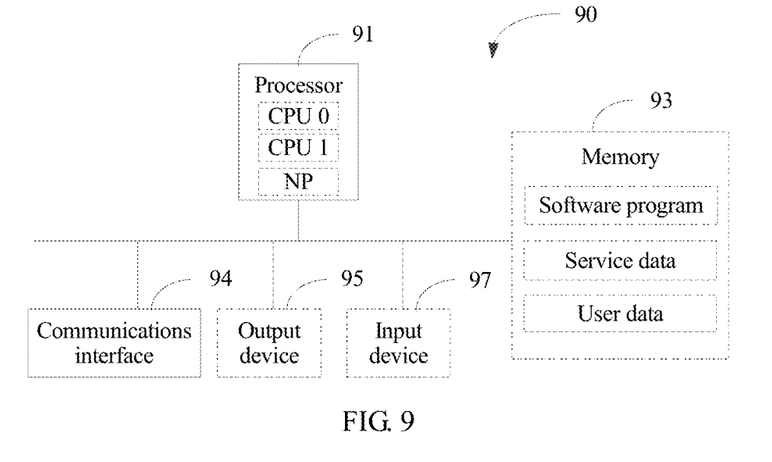
FIG. 9 is a hardware diagram of a mobile edge host according to an embodiment of the present invention.

FIG. 9 is a hardware diagram of a mobile edge host 90 according to another embodiment of the present invention. The mobile edge host may include a processor 91, a communications interface 94, and a memory 93.

The processor 91 may include one or more processing units. The processing unit may be a central processing unit (English: central processing unit, CPU), a network processor (English: network processor, NP), or the like.

The communications interface 94 is configured to be connected to and exchange information with another communications device, including receiving and sending a corresponding message. The mobile edge host 90 may further include the memory 93, and the processor 91 may be connected to the memory 93 and the communications interface 94 by using a bus. The memory 93 may be configured to store a software program, and the software program may be executed by the processor 91, to implement the steps of the methods in the embodiments shown in FIG. 5 and FIG. 6. In addition, the memory 93 may further store various types of service data or user data, including status data of various application instances and services in the steps of the foregoing methods, and the like.

Optionally, the mobile edge host 90 may further include an output device 95 and an input device 97. The output device 95 and the input device 97 are connected to the processor 91. The output device 95 may be a display configured to display information, a power amplifier device configured to play a sound, a printer, or the like. The output device 95 may further include an output controller, configured to provide output to the display, the power amplifier device, or the printer. The input device 97 may be a device used by a user to enter information, for example, a mouse, a keyboard, an electronic stylus, or a touch panel. The input device 97 may further include an input controller, configured to receive and process input from the device, for example, the mouse, the keyboard, the electronic stylus, or the touch panel.

A person of ordinary skill in the art may understand that all or some of steps performed by the processor in the foregoing embodiment may be implemented by using hardware or an instruction controlling related hardware. The instruction may be stored in a computer readable storage medium. The computer readable storage medium may be a read-only memory, a magnetic disk, an optical disc, or the like. In addition, an embodiment of the present invention further provides a computer program product and a storage medium that stores the foregoing computer program. The computer program product includes program code stored in the computer readable storage medium, and the program code is loaded by the processor to implement the foregoing methods.

The foregoing descriptions are merely one or more specific implementations that can implement the present invention. However, the protection scope of the claims is not limited to the foregoing embodiments. Any modification, equivalent replacement, or improvement made based on the technical solutions of the present invention shall fall within the protection scope of the present invention.

What is claimed is:

1. A service notifications method, comprising:
    sending, by a second mobile edge platform comprised in a second mobile edge host, a service availability subscription message to a first mobile edge platform comprised in a first mobile edge host;
receiving, by the first mobile edge platform, the service availability subscription message;
receiving, by the first mobile edge platform, a service registration message that relates to a service, from a first application instance, wherein the first application instance is comprised in the first mobile edge host, and wherein the service registration message comprises a service use indication identifier indicating whether the service is available to be used by an application instance on another mobile edge host;
sending, by the first mobile edge platform, a service notification message to the second mobile edge platform, in response to determining that the service is available to be used by an application instance on another mobile edge host; and
receiving, by the second mobile edge platform, the service notification message.

2. The method according to claim 1, wherein the second mobile edge host further comprises a second application instance, and the method further comprising:
sending, by the second application instance, a service availability subscription message to the second mobile edge platform; and
after receiving the service notification message, identifying, by the second mobile edge platform, that a location of a service instance is not a local location, and sending a service notification message to the second application instance.

3. The method according to claim 2, wherein
the service availability subscription message sent by the second application instance to the second mobile edge platform comprises a location constraint identifier, and the location constraint identifier indicates that the second application instance is subjected to availability of a service hosted by the first mobile edge host and the second mobile edge host.

4. The method according to claim 1, wherein the method further comprises:
receiving, by the first mobile edge platform, a service availability query request of an application instance located on the first mobile edge host, wherein the service availability query request comprises a service location constraint identifier, and the service location constraint identifier indicates whether the application instance queries only a service instance hosted by the first mobile edge host; and
returning, by the first mobile edge platform, information related to a service instance that satisfies a query condition to the application instance, wherein the information comprises an identifier indicating whether the service instance hosted by a same mobile edge host as the application instance that sending the service availability query request.

5. A service notification method, comprising:
receiving, by a first mobile edge platform of a first mobile edge host, a service availability subscription message from a second mobile edge platform of a second mobile edge host;
receiving, by the first mobile edge platform, a service registration message that relates to a service, from a first application instance of the first mobile edge host, and wherein the service registration message comprises a service use indication identifier indicating whether the service is available to be used by an application instance on another mobile edge host; and
sending, by the first mobile edge platform, a service notification message to the second mobile edge platform, in response to determining, based on the service use indication identifier, that the service is available to be used by an application instance on another mobile edge host.

6. The method according to claim 5, wherein the method further comprises:
in response to determining that the service is unavailable to be used by an application instance on another mobile edge host, determining, by the first mobile edge platform, not to send the service notification message to the second mobile edge platform on the second mobile edge host.

7. The method according to claim 5, wherein the method further comprises:
receiving, by the first mobile edge platform, a service availability query request of an application instance located on the first mobile edge host, wherein the service availability query request comprises a service location constraint identifier, and the service location constraint identifier indicates whether the application instance queries only a service instance hosted by the first mobile edge host; and
returning, by the first mobile edge platform, information related to a service instance that satisfies a query condition to the application instance, wherein the information comprises an identifier indicating whether the service instance hosted by a same mobile edge host as the application instance that sending the service availability query request.

8. A mobile edge host, comprising a mobile edge platform, a first application instance, and another application instance, wherein
the first application instance is configured to perform the following steps:
sending a service registration message that relates to a service, to the mobile edge platform, wherein the service registration message carries a service use indication identifier indicating whether the service is available to be used by an application instance on another mobile edge host; and
the mobile edge platform is configured to perform the following steps:
receiving a service availability subscription message from a second mobile edge platform comprised in a second mobile edge host;
receiving the service registration message; and
sending a service notification message to the second mobile edge platform, in response to determining that the service is available to be used by an application instance on the another mobile edge host.

9. The mobile edge host according to claim 8, wherein the mobile edge platform is configured to perform the following steps:
determining not to send the service notification message to the second mobile edge platform, in response to determining that the service is unavailable to be used by an application instance on another mobile edge host.

10. A mobile edge communications system, comprising a first mobile edge host and a second mobile edge host, wherein the first mobile edge host comprises a first mobile edge platform and a first application instance, and the second mobile edge host comprises a second mobile edge platform; wherein
the first mobile edge platform is configured to perform the following steps:

receiving a service availability subscription message from the second mobile edge platform;

receiving a service registration message that relates to a service, from the first application instance, wherein the service registration message comprises a service use indication identifier indicating whether the service is available to be used by an application instance on another mobile edge host; and sending a service notification message to the second mobile edge platform, in response to determining that the service is available to be used by an application instance on the another mobile edge host; and the second mobile edge platform is configured to perform the following steps:

sending the service availability subscription message; and receiving the service notification message.

11. The method according to claim 1, wherein the method further comprises:

in response to determining that the service is unavailable to be used by an application instance on another mobile edge host, determining, by the first mobile edge platform, not to send the service notification message to the second mobile edge platform on the second mobile edge host.

12. The method according to claim 5, wherein the method further comprises:

sending, by the first mobile edge platform, a service notification message to another application instance located on the first mobile edge host subjected to service availability.

13. The method according to claim 5, the method further comprises:

in response to determining that an availability of a service of the first application instance is updated:

receiving, by the first mobile edge platform, a service update message from the first application instance;

sending, by the first mobile edge platform, a service update notification message to the second mobile edge platform on the second mobile edge host; and sending a service update notification message to a second application instance that is located on the first mobile edge host subjected to service availability.

14. The mobile edge host according to claim 8, wherein the mobile edge platform is configured to perform the following steps:

sending a service notification message to another application instance located on the mobile edge host subjected to service availability.

15. The mobile edge host according to claim 8, wherein the mobile edge platform is configured to perform the following steps:

receiving a service availability query request of an application instance located on the mobile edge host, wherein the service availability query request comprises a service location constraint identifier, and the service location constraint identifier indicates whether the application instance queries only a service instance hosted by the mobile edge host; and returning information related to a service instance that satisfies a query condition to the application instance, wherein the information comprises an identifier indicating whether the service instance hosted by a same mobile edge host as the application instance that sending the service availability query request.

16. The mobile edge host according to claim 8, wherein the mobile edge platform is configured to perform the following steps:

in response to determining that an availability of a service of the first application instance is updated:

receiving a service update message from the first application instance;

sending a service update notification message to the second mobile edge platform on the second mobile edge host; and sending a service update notification message to a second application instance that is located on the mobile edge host subjected to service availability.

17. The mobile edge communications system according to claim 10, wherein the first mobile edge platform is further configured to perform the following steps:

receiving a service availability query request of an application instance located on the first mobile edge host, wherein the service availability query request comprises a service location constraint identifier, and the service location constraint identifier indicates whether the application instance queries only a service instance hosted by the first mobile edge host; and returning information related to a service instance that satisfies a query condition to the application instance, wherein the information comprises an identifier indicating whether the service instance hosted by a same mobile edge host as the application instance that sending the service availability query request.

18. The mobile edge communications system according to claim 10, wherein the first mobile edge platform is further configured to perform the following steps:

sending a service notification message to another application instance located on the first mobile edge host subjected to service availability.

19. The mobile edge communications system according to claim 10, wherein the first mobile edge platform is further configured to perform the following steps:

in response to determining that an availability of a service of the first application instance is updated:

receiving a service update message from the first application instance;

sending a service update notification message to the second mobile edge platform on the second mobile edge host; and sending a service update notification message to a second application instance that is located on the first mobile edge host subjected to service availability.

20. The mobile edge communications system according to claim 10, wherein the first mobile edge platform is further configured to perform the following steps:

determining not to send the service notification message to the second mobile edge platform, in response to determining that the service is unavailable to be used by an application instance on another mobile edge host.

* * * * *